Figure 1:
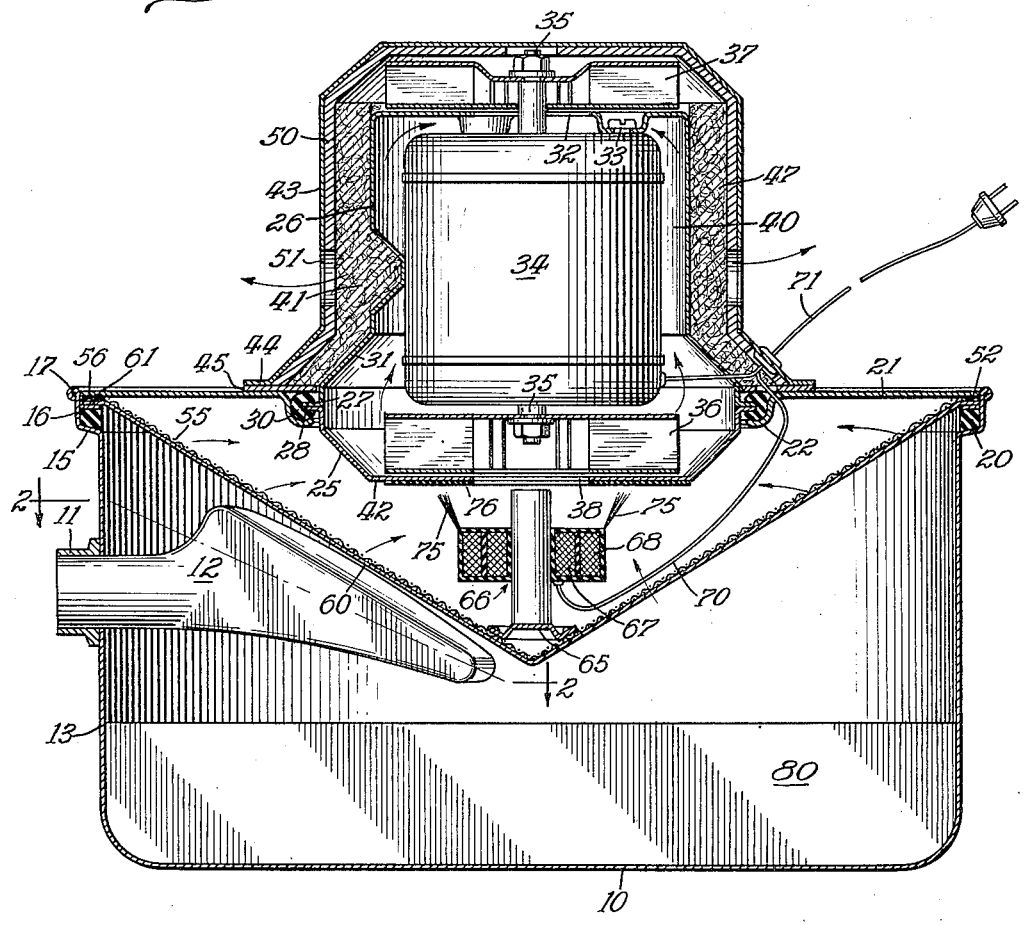

April 23, 1940.　　E. H. YONKERS, JR　　2,198,568
SUCTION CLEANER
Filed Sept. 8, 1937

Inventor:
Edward H. Yonkers, Jr.
By Robert L. Kahn
Atty.

Patented Apr. 23, 1940

2,198,568

UNITED STATES PATENT OFFICE 2,198,568

SUCTION CLEANER

Edward H. Yonkers, Jr., Evanston, Ill.

Application September 8, 1937, Serial No. 162,862

8 Claims. (Cl. 183—37)

This invention relates to a suction cleaner and more particularly to the suction generating and dust storage portion thereof. In the conventional household cleaners, the dust laden air is sucked into a closely woven bag which is supposed to permit the air to escape and trap the dust and dirt. In the operation of such a machine the dust and dirt is carried into the bag and distributed over its inner surfaces so that the resistance to the passage of air through the bag is progressively increased during the normal accumulation of dust in the bag in use. This results in a progressive decrease in the efficiency of the cleaner unless the bag is cleaned frequently. During the operation of the machine, the suction tends to pile up the dust against the bag. In the case of fine dust, there is a tendency for the filter interstices to become filled and trap the air.

An object of this invention is to devise a construction in which the filter tends to clean itself and wherein the main body of dirt is not sucked up against the filter surface. An additional object is to provide a filter medium which is more efficient than a fabric in that a greater percentage of cross-sectional area is accessible for the passage of air, but wherein such passages are so fine as to prevent any but finest dust from passing through. An additional object is to provide such a filter medium in a machine wherein said filter tends to maintain itself in a clean condition. An additional object is to provide a filter medium of the above character of such cheap construction and so readily replaceable as to render the frequent changes of filter easy and cheap and thus permit said suction machine to operate at maximum efficiency.

An additional object of this invention is to devise electric means tending to precipitate fine dust and to generate ozone whereby a sterilizing action on air passing through results.

In this connection, the ozone generating means operating on air pumped through the cleaner system will have a tendency to oxidize odor bearing compounds and freshen the air. As is well known, a supply of ozone is desirable and exerts beneficial effects.

The paper from which the filter is made is commercially sold under the name of Dextilose. It is similar to Japanese tissue in that the paper is formed of long fine cellulose fibers equally strong in all directions without any sizing. This paper may be treated with viscose which tends to bind the fine fiber ends extending from the paper surface and forms a smooth satin finish. Both the treated and untreated paper have excellent air transmitting properties and by choosing the proper thickness, any desired filtering action may be obtained. By having a viscose treated paper, it has been observed that little dust sticks to the smooth filter surface.

By a smooth surfaced porous paper filter I mean a mat of long fibres of cellulose preferably though other suitable material may be used such as glass fibres, cellulose acetate or nitrate fibers, etc., so processed that the ends of the fibers are tied into the structure either by mechanical treatment or by the addition of a cementing material such as precipitated cellulose, the esters of cellulose or other binding materials which may be introduced without substantially reducing the porosity of the paper.

I have found that such a smooth surfaced filter when placed over a dust container provides so little adhesion that a heavy accumulation of dust and dirt is not possible, the dust and dirt flaking off from the action of gravity aided by the draft of incoming air and falling into the container below.

Figure 2:
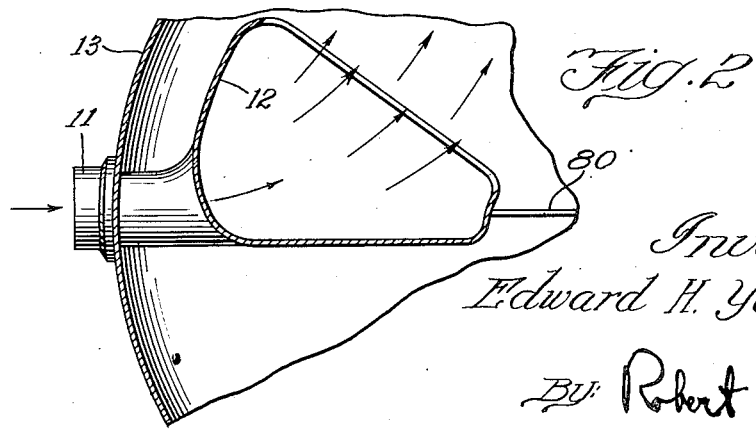

In the drawing, Figure 1 is a sectional view of the machine and Figure 2 is a line on 2—2 of Figure 1.

A pan 10, preferably of metal, is provided in the side wall thereof with an air inlet 11. As seen in Figure 2, air inlet 11 preferably has a nozzle 12 which comes out of wall 13 of the pan. The nozzle 12 is flat and angularly disposed to discharge a flat stream of air substantially parallel to the conical filter element to be later described. The rim of pan 10 is flared outwardly at 15 to form a shoulder and then extends upwardly at 16 to terminate in a bead 17. Disposed around the rim within the shoulder portion thereof, is a rubber gasket 20 upon which the entire mechanism is supported.

The mechanism proper is supported by an annular plate 21 having an inner edge 22 bent down to form a bead and having a circular contour. Supported on the beaded edge 22 of plate 21 are two complemental housings 25 and 26. Both housings terminate in flanges 27 and 28 which are adapted to be disposed face to face. A rubber ring 30 encloses the opposing flanges and serves as the supporting means on the beaded edge 22. Top housing 26, which may be of any shape desired and is here shown of a generally cylindrical shape with a flaring portion 31 at the bottom, is apertured at the top at 32.

Supported from the top portion by means of bolts 33, is an electric motor 34. Motor 34 is provided with a shaft 35 which preferably extends from both sides thereof. Shaft 35 at the bottom end carries an air impeller 36 of usual construction, and at the top, may carry a second stage air impeller 37. Housing 26 extends downwardly as shown and the bottom 42 thereof is provided with a central aperture 38. As is evident from the drawing, bottom 42 of housing 26 is near impeller 36 while aperture 38 permits air to be sucked into the center of the impeller and expelled outwardly therefrom by centrifugal action. Motor 34 is small enough so that an annular space 40 around the motor and within housing 26 is provided. It is clear that air from the periphery of impeller 36 is thrown outwardly toward the junction point of the two housings and then forced upwardly around the motor. This air passes through aperture 32 in the upper housing and into the center of impeller 37 and thence outwardly. To firmly support housing 26 against motor 34, embossings 41 may be provided in housing 26 to bear against the motor frame.

Disposed around housing 26 is a larger housing similar in shape and indicated by numeral 43. This housing, which is preferably of metal, as the other housings, terminates in a flat mounting portion 44 parallel to plate 21. Between mounting portion 44 and plate 21 an annular ring 45 is provided which extends inwardly to housing 26 and serves to cover rubber ring 30 as well as serving as a bottom support for a mass of steel wool 47 packed between the two housings 26 and 43. Housing 43 may be lined with felt or paper 50 throughout its surface to function as a sound deadening medium. The steel wool, or any other suitable material, functions in a similar capacity as a sound deadening medium and to break up any vibration transmitted from the center of the device to the outer housing. Ring 45 and portion 44 of outer housing 43 are permanently attached to plate 21 in any suitable fashion such as by spot welding. Housing 43 and paper liner 50 are provided with a plurality of apertures 51 through which air from the impeller 37 may escape through the steel wool. It is understood, of course, that either the steel wool or the paper insulation or both may be omitted if desired.

The entire motor driven unit supported by plate 21 is disposed over pan 10 as a cover and between the edge 52 of plate 21 and rubber gasket 20, a conical filter element is disposed. This filter element comprises a wire screen member 55 having a flat rim 56 adapted to rest under rim 52 of plate 21. Screen 55 extends downwardly, and, as shown here, forms a cone whose apex is within pan 10. Disposed below metal screen supporting member 55 is a paper filter 60 provided with a rim 61 adapted to rest directly on rubber gasket 20. Filter member 60 is preferably preformed to fit the conical surface of screen 55 and as previously pointed out, is preferably made of a special paper characterized by long fine fibers having no grain, similar to Japanese tissue and sold under the trade name of Dextilose. It is preferred to have this viscose treated in order to bind the loose fiber ends extending like hairs from the surface of the paper and thus give the paper a smooth satin finish. In the viscose treatment the dissolved cellulose merely coats the solid paper matter and does not tend to close any of the pores of the paper inherent in the construction thereof.

Supported at the apex of the cone of screen 55 by means of a bracket 65 is a transformer 66 having primary 67 and a secondary 68. Primary 67 is energized by wires 70 connected to cord 71 for supplying the motor, while secondary 68 has one terminal thereof grounded to the transformer and the other terminal connected to a series of metal brushes 75 extending upwardly toward the motor. The transformer is adapted to step up the supply current to currents at voltages of the order of 10,000 or more volts. Brushes 75 are filamentary in form and are more like a wire comb through which air may readily pass. The tips of the brushes face a mica ring 76 carried by the bottom portion 42 of lower housing 25.

In the operation of the device, air sucked in through aperture 11 is given a rotary motion around the conical filter. Nozzle 12 is so designed that no direct blast of air impinges on the filter element since solid particles travelling at a high velocity would tear the paper. The whirling motion of the air around the conical filter serves to centrifugally separate the heavy particles of dust. The air finally passes through paper filter 60 and screen 55 and past brush 75 and into the center of impeller 36, and then continues on as pointed out above. Because of the high voltage generated by transformer 66, a brush discharge from wires 75 is formed. Inasmuch as the transformer secondary is grounded, the discharge tends to go from wires 75 along the mica to the lower housing 25. The difference in area of the opposing metal surfaces is such that a rectifier action is obtained with the brushes tending to emit electrons. This rectified brush discharge imparts an electric charge to whatever fine dust particles may have passed through the paper filter and tends to precipitate such dust against the machine in general which is predominantly positively charged. In addition, the brush discharge, by virtue of ionizing the air, has a germicidal action which is communicated to all of the air in the room during the operation of the machine.

It is not necessary to bolt plate 21 with the entire mechanism on pan 10, since the air pressure on plate 21 tends to seal the mechanism against rubber gasket 20.

A partition 80 is provided in the bottom of pan 13 to break up any circular air currents at the bottom and thus permit dust and dirt to remain settled during the operation of the device.

What is claimed is:

1. In a suction cleaner, a housing having a dust compartment in the bottom thereof, a conical air filter covering said compartment and extending inwardly thereof, said filter consisting of paper, a perforated conical support disposed above said filter for preventing collapse thereof, a motor and suction fan assembly including an air exhaust supported by said housing above said filter and an air intake for said housing below said filter, said air intake being suitably shaped and disposed to direct the incoming air tangentially along the surface of the paper filter.

2. In a suction cleaner, a housing having a dust compartment in the bottom thereof, a generally conical air filter forming the top cover of said compartment with the apex of the cone extending inwardly toward the bottom of said compartment, said filter comprising a perforated supporting member and a flexible filtering member against said supporting member, an intake connection into said dust compartment below said filter, said intake connection terminating in a nozzle for discharging dirt-laden air adjacent to and parallel with the filter surface and an exhaust connection above said filter.

3. In a suction cleaner, a generally cylindrical pan comprising a dust compartment, a generally conical air filter supported on the rim of said pan with the apex of the cone extending inwardly, said filter comprising a perforated rigid supporting member and a flexible filter against said supporting member, a cover for said pan adapted to engage said rim, a motor and fan carried by said cover and extending over said air filter for exhausting purposes, and an air intake into said pan below said filter including a nozzle for discharging dirt-laden air adjacent to and parallel with the filter surface.

4. In a suction cleaner, a housing having a dust compartment in the bottom thereof, a generally conical fragile filter forming a cover for at least part of said compartment and extending down therein, a perforated member above said filter for supporting and maintaining said filter against collapse, means for generating a suction above said filter, an air intake for said housing below said filter, and means for guiding the incoming dirt-laden air so that the air takes a generally circular path generally parallel to the filter surface and adjacent thereto.

5. In a suction cleaner, a housing having a dust compartment in the bottom thereof, a fragile filter forming a cover for said compartment, said filter having a surface of revolution, a rigid perforated member on one side of said filter having the same shape and against which said filter is adapted to be disposed for supporting and maintaining said filter against collapse, means for generating a suction on said one side of said filter, an air intake for said housing on the other side of said filter for supplying dirt-laden air, and means for guiding the incoming air so that the air takes a generally circular path generally parallel to the filter surface and adjacent thereto.

6. In a suction cleaner, a housing having a dust compartment in the bottom thereof, a convex fragile filter forming a cover for said compartment and extending down therein, said filter having a surface of revolution with the generating line being revolved about a vertical axis, a rigid perforated member above said filter having a similar shape for supporting and maintaining said filter against collapse, means for generating a suction above said filter, an air intake for said housing below said filter, and means for guiding the incoming dirt-laden air so that the air takes a generally circular path around said axis and generally parallel to the filter surface and adjacent thereto.

7. In a suction cleaner, a housing having a dust compartment in the bottom thereof, at least a portion of the side wall of which housing compartment is cylindrical in form, a generally conical fragile filter forming a cover for the cylindrical portion of said compartment and extending down therein in coaxial relation therewith, a perforated member above said filter for supporting and maintaining said filter against collapse, means for generating a suction above said filter, an air intake for said housing below said filter, and means for guiding the incoming dirt-laden air so that the air takes a generally circular path generally parallel to the cylindrically coaxially housed filter surface and adjacent thereto.

8. In a suction cleaner, the combination of an open-topped cylindrical dust receptacle having an annular portion adapted to receive and support a filter element, a generally conical flexible filter element marginally supported upon said annular receptacle portion against downward movement, and a removable group constituting a cover for said compartment and a retainer for holding said filter in said recited association with said dust compartment, said group including a motor-driven suction-generating means and a perforated generally conical filter support bearing upon the receptacle-supported marginal portion of said filter element, complementarily fitted within the filter element proper and bracing same against collapse under differential air pressure induced by said suction-generating means.

EDWARD H. YONKERS, Jr.